US010460328B2

(12) United States Patent
Kapoor et al.

(10) Patent No.: US 10,460,328 B2
(45) Date of Patent: Oct. 29, 2019

(54) RATING AGGREGATION AND PROPAGATION MECHANISM FOR HIERARCHICAL SERVICES AND PRODUCTS

(71) Applicant: International Business Machines Corporation, Armonk, NY (US)

(72) Inventors: Shubir Kapoor, Yorktown Heights, NY (US); Ajay Mohindra, Yorktown Heights, NY (US); Rohit Ranchal, West Lafayette, IN (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 14/744,458

(22) Filed: Jun. 19, 2015

(65) Prior Publication Data

US 2016/0300275 A1 Oct. 13, 2016

Related U.S. Application Data

(63) Continuation of application No. 14/680,427, filed on Apr. 7, 2015.

(51) Int. Cl.
*G06Q 10/00* (2012.01)
*G06Q 30/02* (2012.01)
(Continued)

(52) U.S. Cl.
CPC ........... *G06Q 30/02* (2013.01); *G06Q 10/067* (2013.01); *G06Q 30/0201* (2013.01);
(Continued)

(58) Field of Classification Search
CPC .......... G06F 17/30327; G06F 16/2246; G06Q 30/02; G06Q 10/067; G06Q 30/0203;
(Continued)

(56) References Cited

U.S. PATENT DOCUMENTS 6,856,963 B1 * 2/2005 Hurwitz ............. G06Q 30/0201
705/1.1
6,856,983 B2 * 2/2005 Cox ....................... G06Q 30/02
706/14

(Continued)

FOREIGN PATENT DOCUMENTS

CN 103703465 A 4/2014
WO WO2006/094275 A2 9/2006
WO WO2014/127302 A1 8/2014

OTHER PUBLICATIONS

Aftahi et al. PCT WO 00/43935 International Application No. PCT/US00/00335 (Year: 2000).*

(Continued)

*Primary Examiner* — Thomas L Mansfield
*Assistant Examiner* — Tyrone E Singletary
(74) *Attorney, Agent, or Firm* — Stephen J. Walder, Jr.; Abdy Raissinia

(57) ABSTRACT

Mechanisms are provided, in a hierarchical feedback aggregation (HFA) system implemented in one or more data processing systems, for collecting and presenting user feedback information for a composite offering. A backend engine of the HFA system, implemented in a first data processing system, registers a hierarchical feedback model for the composite offering. A frontend engine of the HFA system, implemented in a second data processing system, receives user feedback for an identified component of the composite offering. The backend engine of the HFA system generates an aggregate user feedback score for the identified component based on a combination of the user feedback for the identified component and aggregate user feedback scores for child components of the identified component in the hierarchical feedback model. The backend engine outputs a (Continued)

representation of the generated aggregate user feedback score for the component to a user.

20 Claims, 8 Drawing Sheets

(51) Int. Cl.
  *G06Q 30/06* (2012.01)
  *G06Q 10/06* (2012.01)
  *G06F 16/22* (2019.01)
(52) U.S. Cl.
  CPC ..... *G06Q 30/0203* (2013.01); *G06Q 30/0278* (2013.01); *G06Q 30/0282* (2013.01); *G06Q 30/0631* (2013.01); *G06F 16/2246* (2019.01)
(58) Field of Classification Search
  CPC ........... G06Q 30/0278; G06Q 30/0201; G06Q 30/0282; G06Q 30/0631
  USPC ....................................................... 705/7.32
  See application file for complete search history.

(56) References Cited

U.S. PATENT DOCUMENTS

| | | | | |
|---|---|---|---|---|
| 7,590,636 | B1* | 9/2009 | Heumann | G06N 5/022 |
| 8,171,032 | B2 | 5/2012 | Herz | |
| 8,249,915 | B2* | 8/2012 | Iams | G06F 17/30699 |
| | | | | 705/26.7 |
| 8,453,068 | B2* | 5/2013 | Stibel | G06Q 30/018 |
| | | | | 705/347 |
| 8,682,911 | B2* | 3/2014 | Widjojo | G06Q 10/02 |
| | | | | 707/752 |
| 8,880,529 | B2* | 11/2014 | Klar | G06F 17/3082 |
| | | | | 707/738 |
| 8,930,243 | B2* | 1/2015 | Tuzhilin | G06F 17/30412 |
| | | | | 705/26.7 |
| 8,984,000 | B2* | 3/2015 | Tuzhilin | G06F 17/30412 |
| | | | | 707/600 |
| 9,135,396 | B1* | 9/2015 | Kalinin | G06F 19/24 |
| 2003/0195796 | A1* | 10/2003 | Konda | G06Q 30/02 |
| | | | | 705/7.29 |
| 2004/0059628 | A1* | 3/2004 | Parker | G06Q 30/02 |
| | | | | 705/12 |
| 2008/0077517 | A1* | 3/2008 | Sappington | G06Q 10/04 |
| | | | | 705/35 |
| 2011/0276444 | A1* | 11/2011 | Tornkvist | G06Q 30/0282 |
| | | | | 705/32 |
| 2012/0072267 | A1* | 3/2012 | Gutierrez, Jr. | G06Q 10/063 |
| | | | | 705/7.39 |
| 2012/0110463 | A1* | 5/2012 | Brolley | G06Q 30/0282 |
| | | | | 715/738 |
| 2013/0197967 | A1* | 8/2013 | Pinto | G06Q 10/0637 |
| | | | | 705/7.28 |
| 2013/0304538 | A1* | 11/2013 | Arad | G06Q 30/0201 |
| | | | | 705/7.29 |
| 2014/0257939 | A9* | 9/2014 | Britton | G06Q 10/10 |
| | | | | 705/7.41 |
| 2014/0258033 | A1* | 9/2014 | Ratterman | G06Q 10/10 |
| | | | | 705/26.35 |
| 2015/0220530 | A1* | 8/2015 | Banadaki | G06F 17/30943 |
| | | | | 707/723 |
| 2016/0055250 | A1* | 2/2016 | Rush | G06Q 50/01 |
| | | | | 707/733 |

OTHER PUBLICATIONS

Afahi et al. PCT WO 00/43935 International Application No. PCT/US00/00335 (Year: 2000).*
"List of IBM Patents or Patent Applications Treated as Related", 2 pages.
"About Comments, Feedback, & Ratings", Amazon.com, http://www.amazon.com/gp/help/customer/display.html?nodeId=537806, accessed on Feb. 3, 2015, 2 pages.
"About Customer Ratings", Amazon.com, http://www.amazon.com/gp/help/customer/display.html?nodeId=200791020, accessed on Feb. 3, 2015, 1 page.
"Android Apps on Google Play", Google Inc., https://play.google.com/store/apps?hl=en, accessed on Feb. 3, 2015, 2 pages.
"Angie's List", Angie's List, http://www.angieslist.com/, accessed on Feb. 3, 2015, 5 pages.
"Candy Crush Saga by King.com Limited", Apple Inc., https://itunes.apple.com/us/app/candy-crush-saga/id553834731?mt=8, accessed on Feb. 3, 2015, 2 pages.
"IMDb Top 250", IMDb.com, Inc., http://www.imdb.com/chart/top, accessed on Feb. 3, 2015, 11 pages.
"Weighted Sort", Google, https://support.google.com/analytics/answer/1042020?hl=en, accessed on Feb. 3, 2015, 3 pages.
"Welcome to Bazaarvoice", Bazaarvoice, Inc., http://www.bazaarvoice.com/, accessed on Feb. 3, 2015, 5 pages.
"Yelp—Dallas Restaurants, Dentists, Bars, Beauty Salons, Doctors", Yelp Inc., http://www.yelp.com/, accessed on Feb. 3, 2015, 4 pages.
IBM Corporation, "System and method for an enterprise rating service", IP.com Prior Art Database Technical Disclosure, IP.com No. 000177990, Jan. 12, 2009, 3 pages.
Kang, Curtis et al., "Method and System for Social Branding and Recommending Emerging Brands in Online Marketplaces", IP.com Prior Art Database Technical Disclosure, IP.com No. 000238488, Aug. 28, 2014, 3 pages.

* cited by examiner

RATING AGGREGATION AND PROPAGATION MECHANISM FOR HIERARCHICAL SERVICES AND PRODUCTS

This application is a continuation of application Ser. No. 14/680,427, filed Apr. 7, 2015, status pending.

BACKGROUND

The present application relates generally to an improved data processing apparatus and method and more specifically to mechanisms for providing rating aggregation and propagation for hierarchical services and products.

With the wide availability of products and services through electronic commerce platforms, with a large number of similar offerings to choose from, it has become important to accurately assess and evaluate the quality of the offerings. That is, given two similar services, for example, users find it important to be provided with information to assist them with deciding which service to select for their use. In order to provide such information, may providers of services and/or products have implemented a user/customer feedback mechanism by which the user/customer can provide information indicative of the user's perceived quality of the service or product. It has been found that users/customers trust such peer feedback much more than any vendor's marketing or advertisements since they believe the peer feedback helps them to make more informed decisions and obtain a best value for their investment of time and/or money.

On the other side, electronic commerce platforms and developers/sellers obtain such peer feedback information to assist them in improving the quality of their offerings. That is, by obtaining feedback from the users/customers as to where quality is lacking, the providers of the electronic commerce platforms may take action to modify the electronic commerce platform to improve the user/customer's experience interacting with the platform. With regard to developers/sellers of products/services, the developers/sellers may collect such peer feedback to improve quality of their products/services. Moreover, with the continuous move towards cloud services and application stores, peer feedback has become even more important as the offering providers need quick feedback through the development and operations process to improve their offerings at every iteration.

SUMMARY

In one illustrative embodiment, a method, in a hierarchical feedback aggregation (HFA) system implemented in one or more data processing systems, each data processing system comprising a processor and a memory, for collecting and presenting user feedback information for a composite offering. The method comprises registering, by a backend engine of the HFA system implemented in a first data processing system, a hierarchical feedback model for the composite offering. The method further comprises receiving, via a frontend engine of the HFA system implemented in a second data processing system, user feedback for an identified component of the composite offering. Moreover, the method comprises generating, by the backend engine of the HFA system, an aggregate user feedback score for the identified component based on a combination of the user feedback for the identified component and aggregate user feedback scores for child components of the identified component in the hierarchical feedback model. In addition, the method comprises outputting, by the backend engine, a representation of the generated aggregate user feedback score for the component to a user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
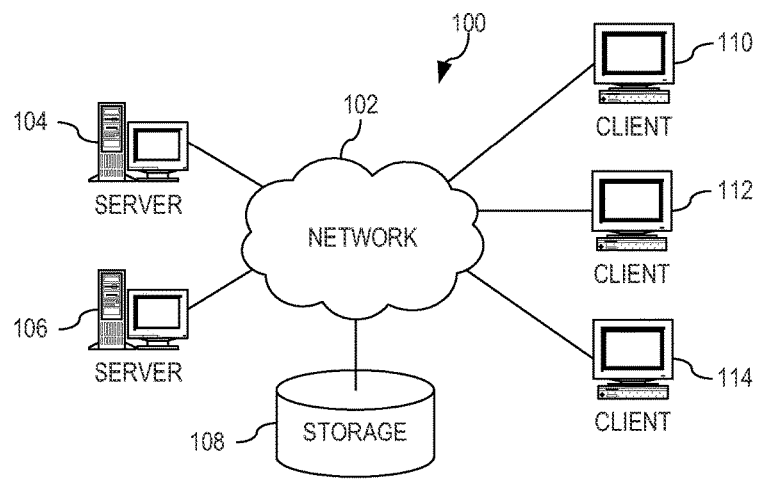
FIG. 1 is an example diagram of a distributed data processing system in which aspects of the illustrative embodiments may be implemented.

The illustrative embodiments provide mechanisms for peer feedback aggregation and propagation directed towards hierarchical offerings, e.g., services and/or products. The mechanisms of the illustrative embodiments recognize peer feedback, e.g., user ratings, as a combination of multiple peer feedback components, or separate user rating components, rather than a single peer feedback or rating directed to quality. For purposes of the present description, peer feedback will be assumed to be provided in the form of a user ratings which are quantifiable. However, it should be appreciated that the illustrative embodiments are not limited to such and any peer feedback form can be utilized with the mechanisms of the illustrative embodiments as long as the peer feedback is able to be aggregated and propagated in the manner described herein.

In one illustrative embodiment, user ratings (peer feedback) is a composite of a first rating component and a second rating component where the first rating component is directed to a user or customer's subjective evaluation of the quality of the services or products and the second rating component is directed to a user or customer's subjective evaluation of the relevance of the service or product to the user or customer's needs. These ratings are aggregated based on the relevance being a weighting applied to the quality rating such that a single rating is provided for the service or product. Moreover, various other weightings may be applied during aggregation of ratings as will be described hereafter, e.g., weightings due to edge weights in a hierarchical model, weightings due to user/customer evaluations, and the like.

The resulting aggregated single rating value for a service or product is then propagated up a defined hierarchy associated with the service or product such that the rating value of the service or product is used to influence the rating values (also referred to herein as simply the "rating") of other entities associated with the service or product. The defined hierarchy comprises nodes and edges organized in a hierarchical manner, where nodes represent related entities, one of which is the service or product, and edges represent relationships between the entities. Edges may have associated weights or strengths corresponding to the relevance of the rating of lower nodes to the rating of higher nodes in the hierarchy. Weighted calculations are utilized to quantify a rating of higher nodes based on a combination of the rating of the higher node itself and a contribution of the rating of lower nodes. Moreover, nodes that do not have a corresponding rating (i.e. direct rating) may have their rating inferred (i.e. an indirect rating is calculated) from similar nodes elsewhere in the same or different hierarchy based on a determined level of similarity.

It should be appreciated that the terms "services" and "products" in the present description are used to represent entities or items that can be purchased, used, or viewed by end users/customers. That is, a "service" is any entity or item that provides a function or performs work on behalf of a user or customer. A "product" is an item that is able to be purchased or obtained by a user or customer for use by the user or customer. In the context of computer based "services" and "products", the services and products may be provided via dedicated hardware, software executing on specialized or general purpose hardware, or any combination of hardware and software. Both "services" and "products" will be referred to herein collectively as "offerings" where the offerings are provided by a provider which may be any entity, computer system, or the like, that makes the offerings available to users or customers for use.

As mentioned above, user/customer feedback mechanisms have been known in the electronic commerce (E-commerce) domain, but these feedback mechanisms are limited to an atomic electronic commerce offering. That is, each electronic commerce feedback mechanisms allows users/customers to provide only quality feedback for a single service/product. These feedback mechanism utilize averaging for the feedback aggregation over multiple users/customers, however, average feedback does not always reflect the true quality of the offering, especially when there is not enough feedback data available. For example, for the following 3 different sets of user/customer feedback, in the form of a 5-star rating scale, the average is the same but the true quality may not be the same:

(4) vs. (4,4) vs. (5,3,4)=>4 vs. 4 vs. 4

Furthermore these feedback mechanisms perform their aggregation, or averaging, on flat feedback for an atomic or single offering and do not consider any hierarchical relationships among offerings or other entities. In addition, these feedback mechanism allow only a single form of feedback to be provided, e.g., a single 5-star rating scale for rating quality. The present invention recognizes that feedback may be provided in many different forms as different rating factors including ratings according to a defined scale (e.g., a 5-star scale), helpfulness votes, natural language comments, or the like. Having multiple types of rating factors makes aggregation of feedback more complex such that simple averaging of a single type of rating, as is done in known feedback mechanisms, is not possible.

The illustrative embodiments provide mechanisms for aggregating user/customer feedback using multiple types of rating factors and then propagating these aggregated feedback values through the hierarchical relationships with other entities. The illustrative embodiments may be provided as an on-demand service that utilizes a frontend component that may be deployed to an offering provider's computing system, e.g., server, and operates to both gather feedback input from users/customers as well as present feedback information to those users/customers for their use in making decisions. The illustrative embodiments further provide a backend component that provides the computational aspects of the illustrative embodiments with regard to aggregating the various rating factors provided by the users/customers and propagating them to related entities in a defined hierarchy.

Thus, the illustrative embodiments offer on-demand feedback collection and presentation through an embeddable frontend component, such as a widget or the like. The backend component performs automatic feedback aggregation in a transparent and asynchronous manner without any interference with the functionality of the offering (e.g., service) that uses the feedback information. The backend component provides an independent Application Programming Interface (API) that is not tied to a particular type of frontend component, such that the backend component can be used with a plurality of different frontend components. The backend component exploits the hierarchical relationships among different nodes for feedback propagation and aggregation to have a more accurate and fine-grained feedback scoring of the various entities of the hierarchical offerings.

The feedback from the users/customers is received as a plurality of factors, such as a quality rating and a relevance rating, which may be provided in different formats or types. The quality rating is a metric for the quality of the offering while the relevance is a metric that quantifies how useful the offering is to satisfy the needs of the user/customer.

The on-demand feedback mechanisms of the illustrative embodiments may be provided as a building block and composed with other services to develop a broader and richer solution. The on-demand feedback mechanisms of the illustrative embodiments reduce the time to build new solutions which have a requirement for user/customer feedback. The ability to quickly start monitoring offerings for user/customer feedback helps to provide rapid feedback and make updates just in time for the next version of the offering, thereby reducing the delivery cycle time.

The details of example implementations of the illustrative embodiments will be described hereafter utilizing example equations, procedures, and apparatus for implementing the mechanisms of the illustrative embodiments. In the description of these example implementations, it will be assumed that the offering being evaluated is a service offered by a provider via one or more computing devices via one or more data networks. It will further be assumed that the feedback is collected from users of the service. The service is being used in this description as an example for ease of understanding with regard to the hierarchical propagation of ratings since it is easier for individuals to recognize services as having multiple levels of components and related services. However, it should be appreciated that products also have multiple levels of components and may likewise be the subject of the mechanisms of the illustrative embodiments. Thus, while services and users of such services will be used in the following example implementations of the illustrative embodiments, the illustrative embodiments and the present invention are not limited to such and may be applied to evaluation of any offering.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should further be understood that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
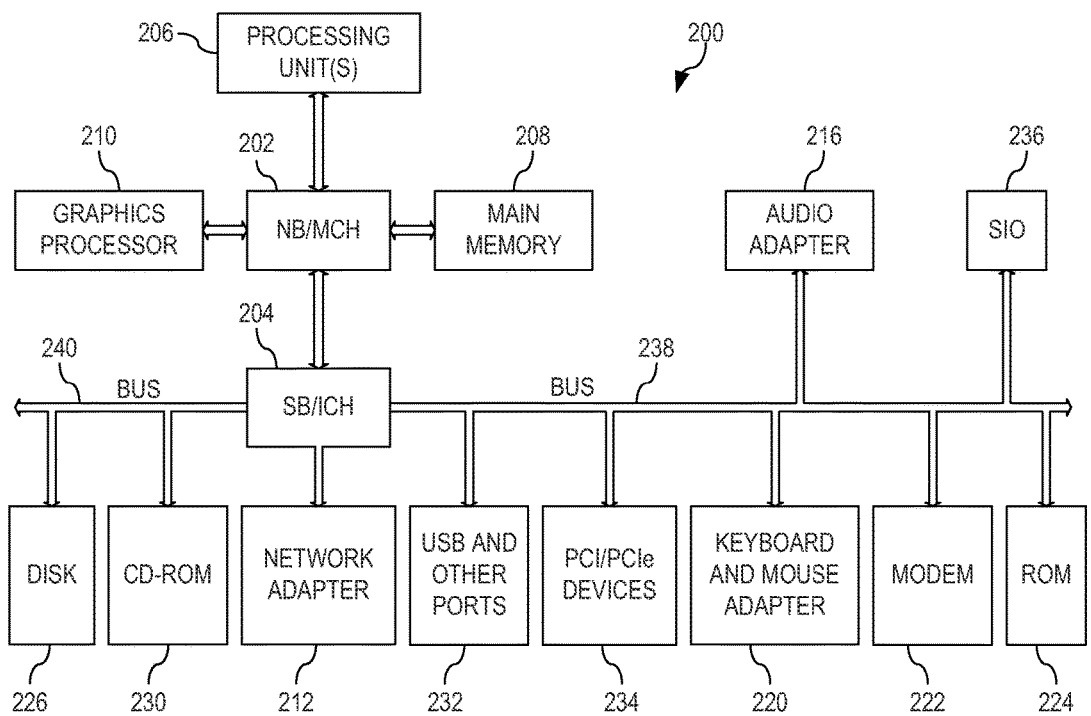
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the server computing devices 104, 106 provides one or more services to users of client devices 110, 112, and/or 114. These services may comprise a hierarchy of components or services and sub-services that are related to one another and which together constitute an overall composite service. For example, an E-commerce ordering service may have constituent services such as an order acceptance service, a seller service, and a payment service which together constitute the overall composite E-commerce ordering service. Likewise, each of these constituent services may have sub-services as well. Multiple levels or layers of the hierarchical representation of the composite service may be present and represented in a hierarchical model data structure of the composite service. Through a registration process, a service provider may register with the on-demand hierarchical feedback aggregation system of the illustrative embodiments and provide a hierarchical user feedback model of the composite service in which nodes represent the components or constituent services of the overall composite service with edges representing the relationships between these components or constituent services. In short, the nodes represent any part of the composite service that may be experienced by an end user and which may be rated by an end user through a feedback mechanism while the edges represent the dependencies between components or constituent services of the composite service.

The server computing devices 104, 106 may host or execute software engines or modules that utilized user feedback to perform analytics, generate reports, or provide other output to a provider of the services to assist in improving the provider's offerings to users. These software engines or modules are referred to herein as service specific feedback consoles. These services specific feedback consoles perform additional analytical operations and/or output operations specifically desired by the provider of the services based on feedback analytic results provided by the mechanisms of the illustrative embodiments. Alternatively, the service specific feedback consoles may provide an interface through which the results of the operations of the illustrative embodiments may be presented to an administrator or other authorized individual associated with the service provider for use by the authorized individual in making user feedback based decisions regarding the services provided by the provider.

The mechanism of the illustrative embodiments may interface with these services specific feedback consoles via a frontend engine of the on-demand hierarchical aggregate feedback system of the illustrative embodiments. This frontend engine may be utilized to collect user feedback information and provide this user feedback information to a backend feedback aggregation and propagation engine that operates to aggregate user feedback of various feedback factor types and propagate this feedback in accordance with the established composite service hierarchical user feedback model for the particular composite service and its related components or constituent services.

The frontend engine may be deployed to the service specific feedback consoles in an on-demand manner. By "on-demand" what is meant is that the service provider may request the assistance of the on-demand hierarchical aggregate feedback system when needed and the frontend engine may be deployed into the software environment of the server computing device so as to execute and gather feedback information from users. Alternatively, the frontend engine may already be deployed into the server computing device's software environment, such as in response to a registration process performed by the provider, but may be enabled in an on-demand manner by an on-demand request from the provider, such as via an administrator console or the like, which submits the request to the on-demand hierarchical feedback aggregation system of the illustrative embodiments.

The frontend engine operates in a parallel manner with the services offered by the server computing device such that the frontend engine does not interfere with the operation of the services and does not require a modification of the services to permit the use of the frontend engine. The frontend engine gathers the user feedback as described hereafter and also provides functionality for providing an output of previously aggregated user feedback to the users and also provides an interface through which the service provider may obtain user feedback information generated by the backend user feedback aggregation and hierarchical propagation engine.

Another server, such as server 106, may provide the on-demand hierarchical feedback aggregation system of the illustrative embodiments and service requests from other service providers for on-demand access to the functionality of the on-demand hierarchical feedback aggregation system. As such, the server 106 may provide the frontend engines of the on-demand hierarchical feedback aggregation system to a service provider's server 104 via the network 102 for installation on the service provider's server 104, for use in gathering user feedback information. Initially, the service provider may follow a registration process with the on-demand hierarchical feedback aggregation system (hereafter referred to as the hierarchical feedback aggregation (HFA) system for simplicity) on server 106 to register a composite service with the HFA system and provide a hierarchical feedback model for the composite service. The HFA system on server 106 may provide an interactive tool through which the provider is able to graphically construct the hierarchical feedback model using nodes and edges to represent the components of the composite service and their relationships (or dependencies).

It should be noted that in such a hierarchical feedback model, the nodes represent the components of the composite service for which user feedback is sought and the edges represent the relationships between these components. These components may represent atomic or composite services within the overall composite service, data structures utilized by the overall composite service, individual persons or components of a service with which a user may interact (e.g., customer service personnel), or any other entity that a user may interact with when utilizing the overall composite service or a sub-portion of the overall composite service. Edges within the hierarchical feedback model may be assigned weights which represent the amount of dependency of user feedback on the user feedback of the related nodes.

For example, if node B is a child node of node A in the hierarchical feedback model, and the edge between node B and node A has a weight of 0.35, then 35% of the user feedback score generated for node B influences the user feedback score for node A, as will be described in greater detail hereafter. The weight of an edge may be initially set by the provider of the composite service during the registration process but may be dynamically updated based on evaluations of actual utilization of components of the composite service such that the weights may be dynamically adjusted in the hierarchical feedback model.

Having obtained the hierarchical feedback model for the composite service offered by the service provider via their server 104, the HFA system may receive a request from the service provider to initiate user feedback collection and aggregation based on the hierarchical feedback model. In response, if the frontend engine of the HFA system has not already been deployed to the server 104 in response to the registration process, then the frontend engine is provided to the server 104 and deployed within the software environment of the server 104 for execution. This deployment may involve installation of the frontend engine in association with a service specific feedback console in some instances which provides the user feedback questions for the various components of the composite service with the frontend engine collecting the user input to these questions and providing the collected feedback to the backend feedback aggregation and propagation engine of the HFA system on server 106. The questions that are posed by the service specific feedback console may be specific to the particular service or component with which the service specific feedback console is associated, e.g., "How would you rate the quality of the Emergency Response Weather Service application?" rather than a generic "How would you rate your experience today?"

Alternatively, the frontend engine may be configured to provide the questions for presentation to users to solicit feedback and may collect the resulting feedback and provide it to the HFA system backend engine. In such a case, the frontend engine may comprise a generic question structure which is then customized to the specific hierarchical feedback model associated with the composite service with which it is deployed. For example, the set of questions may comprise generic templates that have fields that are populated for the various nodes of the hierarchical feedback model for which feedback is being sought. Thus, the same or similar questions may be repeated for various nodes of the hierarchical feedback model such that user feedback may be solicited for multiple levels of the hierarchical feedback model, e.g., "On a scale of 1 to 5, how would you rate the quality of your experience with the ACME PAYMENT SERVICE today?", "On a scale of 1 to 5, how would you rate the quality of your experience with the ACME ORDER ACCEPTANCE SERVICE today?", or the like, which the capitalized terms are names of nodes in the hierarchical feedback model.

Via the frontend engine, and/or a service specific feedback console if one is provided, users submit feedback regarding the composite service, and the individual components of the composite service, which is collected for further aggregation, propagation, and analysis as described hereafter. In addition, the frontend engine may provide an interface through which users are able to see feedback for different offerings, e.g., different services provided by the service provider. Thus, in addition to collecting user feedback and submitting the user feedback to the backend engine of the HFA system, the frontend engine further allows users to submit queries or requests for aggregated feedback information from the backend engine and provides mechanisms for presenting or outputting this requested aggregated feedback information to the user. Thus, the frontend engine has two primary modes of operation: an input mode and an output mode. In the input mode, the frontend engine collects user feedback information. In the output mode, the frontend engine presents the aggregated feedback information to users via one or more output graphical user interfaces.

As noted above, the feedback information that is received, aggregated, propagated, analyzed, and ultimately provided as an output comprises multiple types of rating information. In one illustrative embodiment, the feedback information comprises a rating, which represents the quality of the service as perceived by the user, and a relevance, which represents the importance of the service to the user's needs as perceived by the user. These feedback information factors may be aggregated together to generate a single feedback score for the service by utilizing the relevance as a weighting factor to the rating factor, i.e. feedback score=rating*relevance. Each factor may be provided using an acceptable scale for the particular implementation. The scales for each factor may be the same or different with a correlation function being used to correlate one factor to another when different scales are utilized. For ease of explanation, it will be assumed that each factor is evaluated using a same type of scale, e.g., a 1 to 5 star scale. Of course, other factors may also be utilized, and other calculations may be used to generate a single feedback score without departing from the spirit and scope of the illustrative embodiments.

In one illustrative embodiment, in addition to considering the rating and the relevance, an evaluation of the user providing the feedback information may also be taken into consideration. For example, when a user utilizes the service provided by the service provider via server 104, the user may be required to provide some information either knowingly or unknowingly. Knowingly, the user may register with the service provider and provide certain demographic information including age, gender, ethnicity, geographical home location, occupation, likes, dislikes, etc. Unknowingly, the user's accessing of the server 104 may allow the server 104 to collect IP address information which can be correlated to a geographical region, for example, the user's history of previously provided feedback may be compiled and accessed to identify the user's credibility based on the previously left user feedback, or the like. Information gathered about the user may be compared against certain service provider criteria for evaluating users that provide feedback information. For example, the frontend engine may be able to access service provider registered user information to provide to the backend engine of the HFA system along with the user feedback information so that the backend engine can compare the demographics of the users with demographics of interest as registered by the service provider during the registration process and associated with the hierarchical feedback model.

For example, a service provider may have as their primary targeted consumer, males aged 30-40. If a user that provides feedback information via the frontend engine also has demographics indicating that the user is a male aged 35, then the user weight applied to the feedback information may be given a relatively higher user weighting than if the user were a female aged 55 or a male aged 60, for example. While these other users may have their user weight relatively lower than the male aged 35, this does not mean that their weight is necessarily zero, but some value less than that of the targeted user. Similar evaluations may be made with regard to user information that is unknowingly provided by the user, e.g., if the targeted users are users in the New York City geographical area and the user's IP address indicates the user to be located in a region in South Carolina, then the user weight associated with the user will be relatively lower than users that actually reside in the New York City geographical area. The user weights may be applied to the aggregate of the rating and relevance discussed above so as to weight the user's feedback information relative to other user's feedback information.

The feedback information collected by the frontend engine is provided back to the backend feedback aggregation and propagation engine (also referred to herein as the "background engine") for calculation of aggregate feedback scores, propagating the aggregate feedback scores, and potentially performing other analytical operations on the aggregated and propagated feedback scores so as to provide hierarchical feedback information back to the service provider in accordance with service provide requests for such hierarchical feedback information. Moreover, the background engine may further dynamically update the feedback hierarchy structure based on actual utilization of the components of the composite service so as to adjust edge weights or the like to more accurately represent the dependencies of user feedback between the various components of the composite service. In general, the background engine calculates an individual feedback score for a particular combination of user and node of the hierarchical feedback model and then, using the hierarchical feedback model and propagation rules and equations established for propagating feedback through the hierarchical feedback model, propagates the user feedback for the node to other related nodes in the hierarchical feedback model to thereby update the user feedback scores for these other related nodes. The details of the operation of example embodiments of the backend engine will be provided hereafter.

Figure 3:
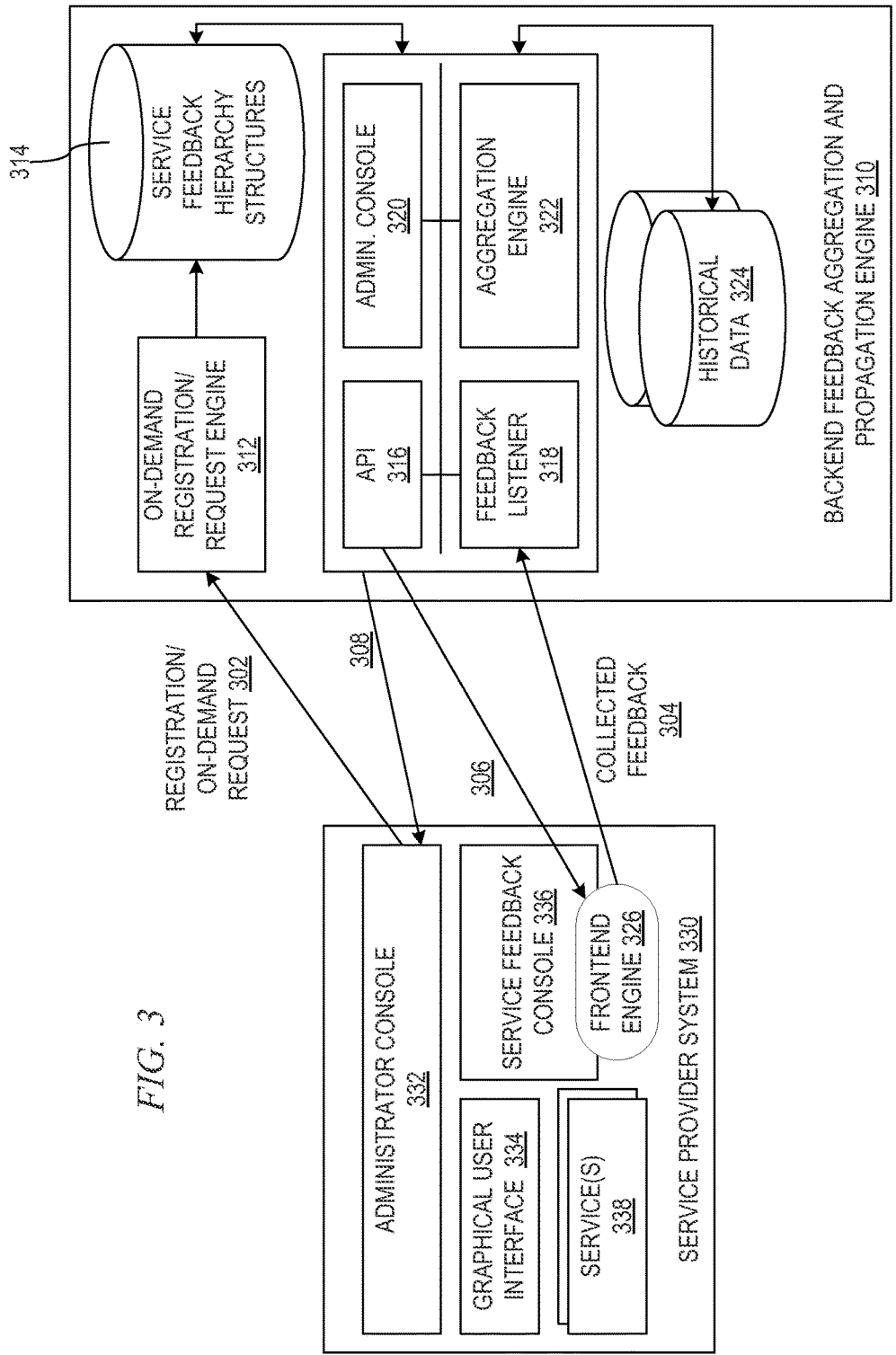
FIG. 3 is an example block diagram of the primary operational elements of an on-demand hierarchical aggregate feedback system in accordance with one illustrative embodiment.

FIG. 3 is an example block diagram of the primary operational elements of an on-demand hierarchical feedback aggregation (HFA) system in accordance with one illustrative embodiment. The various elements shown in FIG. 3 may be implemented as computer hardware elements, software loaded into, and executing on, computer hardware, e.g., processors and memories, or any combination of hardware and software elements. Moreover, while the depiction in FIG. 3 illustrates the HFA system comprising a single front end engine 326 deployed in a single service provider system 330 with a single backend feedback aggregation and propagation engine 310, the illustrative embodiments are not limited to such. It should be appreciated multiple front end engines 326 may be deployed into various software environments provided on the same or different computing devices and may communicate with the backend feedback aggregation and propagation engine (hereafter referred to as the "backend engine") 310 via one or more data networks and the application programming interface 316 and feedback listener 318 of the backend engine 310.

As shown in FIG. 3, the HFA system is generally comprised of one or more front end engines 326 deployed in one or more software environments of one or more data processing or computer systems, and a backend engine 310 the comprises the logic for performing the various backend calculations and operations for aggregating user feedback information and propagating this user feedback information through a defined composite service feedback hierarchy structure for a composite service. It should be appreciated that the term "logic" as used herein refers to either hardware of software logic, where hardware logic is typically provided as hardware circuitry elements, e.g., logic gates, wires, buffers, and other types of circuit elements, and software logic is provided as software instructions and data that are loaded into memory and executed by one or more processors of one or more data processing systems or computers.

The backend engine 310 comprises an on-demand registration/request engine 312 which provides logic for registering composite services for user feedback information collection, aggregation, and hierarchical propagation. The backend engine 310 further comprises logic for handling on-demand requests from service providers for initiating user feedback information collection, aggregation, and propagation for registered composite services. In operation, when a service provider wishes to utilize the on-demand HFA system of the illustrative embodiments, an administrator or other authorized individual of the service provider may utilize an administrator console 332 of the service provider system 330 and log onto 302 the HFA system to interact with the on-demand registration/request engine 312 to register the composite service that is to be monitored for user feedback information collection, aggregation, and propagation. As part of the registration process, the authorized user may utilize the on-demand registration/request engine 312 to construct, or otherwise submit, a hierarchical feedback model for a composite service that is to be monitored for user feedback information collection, aggregation, and propagation. The hierarchical feedback model is stored in the service feedback hierarchy structures database 314. The hierarchical feedback model comprises nodes and edges connecting nodes, where the nodes represent components of the composite service, e.g., sub-services, data structures, human resources (service personnel), and other components that together constitute the composite service. The edges may be assigned initial weights indicative of the relative dependence of a higher level node on its child lower level nodes.

In addition to the hierarchical feedback model, the authorized user may further indicate particular users of interest for which user feedback information is most desirable. For example, the authorized user may specify the demographic characteristics of users that are their target for user feedback information. This target user information may be used to compare to information about users that leave user feedback information to determine how much or little to weight that particular user's feedback information, as described hereafter.

The on-demand registration/request engine 312 further comprises logic for handling on-demand requests 302 for initiating the collection, aggregation, and propagation of user feedback information for a registered composite service. In response to a request from an administrator console 332 to initiate user feedback collection, aggregation, and propagation, if the frontend engine 326 has not already been deployed to a software environment for the composite service in the service provider system 330, then the frontend engine 326 is deployed to the service provider system 330. In some illustrative embodiments, the frontend engine 326 may be provided as an applet, plug-in component, or other software element that does not need a formal installation process and instead is provided as an extension of the software environment. In other illustrative embodiments, the frontend engine 326 may be installed on the service provider system 330 and may operate as a background application that collects user feedback information and sends it to the backend engine 310.

As shown in FIG. 3, in some illustrative embodiments, the frontend engine 326 may operate in conjunction with a service specific feedback console 336 which provides the logic for presenting questions to a user to solicit feedback information which is then collected and forwarded by the frontend engine 326. In such a case, the frontend engine 326 may be generic in nature such that the same frontend engine 326 may be deployed as separate instances in multiple software environments of composite services on the same or different service provider systems 330. In other illustrative embodiments, the frontend engine 326 may be customized to the specific composite service and may perform the operations of both the service specific feedback console 336 and the frontend engine 326. In such an embodiment, the frontend engine 326 may have templates for questions that can be presented to the user for soliciting user feedback, with fields of the templates being populated by information regarding the nodes and edges of the composite service's hierarchical feedback model stored in the service feedback hierarchy structures 314.

Once the frontend engine 326 is deployed into the software environment of the composite service of the service provider system 330, and its operation is initiated in response to an on-demand request from the administrator console 332, monitoring of the user feedback information is performed. The service provider system 330 provides a graphical user interface 334 through which users may access the services 338 provided by the service provider system 330. The services 338 together may constitute a composite service as a whole.

In response to a user selecting to terminate a session with the service provider system 330 or otherwise indicating that the user has finished utilizing one or more of the services 338, the service feedback console 336 may output to the user, via the graphical user interface 334, one or more questions to solicit feedback from the user. The questions may utilize a defined rating scale for rating the services 338, or the composite service as a whole, with regard to quality and for evaluating the services 338 or composite service with regard to relevance to the user's needs. The rating scale may be different from quality rating than from relevance rating. For example, the quality rating may utilize a 5-star rating scale where a higher number of stars selected by the user indicates a higher user perceived quality of the services 338. The relevance rating may be provided as a positive or negative vote, e.g., thumbs up or thumbs down indication. Alternatively, all ratings may utilize the same rating scale.

The frontend engine 326 may further collect information about the user providing the feedback information. This information may be knowingly or unknowingly (by the user) obtained by the frontend engine 326. For example, the user may have an established profile with the service provider system 330 and this profile may be provided along with the feedback information by the frontend engine 326 to the backend engine 310. The user information may also be solicited from the user as one or more questions presented along with the user feedback information questions, e.g., questions asking for the user's age range, gender, economic status, and the like. The user information may be unknowingly obtained by utilizing background information collected from the header or metadata of the user's data communications with the service provider system 330. This information may include, for example, IP address, geographical region information, or any other information that may be present in the header or metadata of data communications.

The user feedback information and user information may be collected by the frontend engine 326 and provided 304 to the backend engine 310 via the feedback listener 318 which listens for feedback information transmissions from one of more frontend engines 326. The feedback listener 318 receives the user feedback information and provides it to the aggregation engine 322. The aggregation engine 322 implements aggregation algorithms for aggregating and propagating the user feedback information utilizing the composite service feedback model registered for the composite service in the service feedback hierarchy structures 314. In general, the aggregation engine 322 generates an aggregate feedback score for the node for which the user feedback corresponds by calculating a value for a function of the user feedback, relevance rating, weighting due to the user being or not being a target user for the composite service, and further taking into consideration contributions from feedback scores of lower level child components of the composite service. The aggregate feedback score for the node is then propagated up the hierarchy of the hierarchical feedback model of the composite service in accordance with the weights of edges in the hierarchical feedback model so as to provide contributions to the aggregate feedback scores of the nodes which are parents of the current node.

The resulting aggregate feedback scores for the various nodes of the hierarchical feedback model are stored in the historical data structure 324 for future analytical operations and providing of information to users and/or administrators in performing decisions. For example, the historical data 324 may be used to present 306 ratings of components of the composite service to a user via the frontend engine 326. Alternatively, the historical data 324 may be accessed 308 by an administrator or other authorized individual of the service provider system 330 via the administrator console 332 or an administrator/authorized individual of the HFA system via the administrator console 320. The historical data provided to a user may comprise the aggregate user feedback for a service or component of interest. The historical data provided to an administrator may be more in-depth and indicate information about aggregate user feedback as well as the underlying hierarchical feedback model, for example.

In addition, the user feedback received may be used to update the edge weights of corresponding edges in the hierarchical feedback model of the composite service. For example, the usage of a service or component of the composite service by the user, as indicated by the user providing feedback for the service or component, may be used to update usage parameters associated with the corresponding nodes which may in turn cause an update to the edge weights based on the usage. That is, nodes that are determined to be more utilized are more influential in the user feedback ratings of other related nodes in the composite service. This influence fades the further away from the node the other nodes are in the hierarchical feedback model. Thus, the weights of edges may be modified by a decreasing amount as one traverses the hierarchical feedback model up the edges connecting nodes to the current node for which the usage is determined to have changed. Thus, for example, using a function based on the amount of increase in usage and the distance of the edge from the current node for which the usage changed, the edge weight of an edge may be dynamically updated.

As mentioned above, the illustrative embodiments provide for the aggregation of user feedback and the propagation of the user feedback in accordance with established composite service hierarchical feedback models. FIGS. 4A-4E are example diagrams of hierarchical feedback models for offerings which may be used to provide on-demand hierarchical feedback aggregation in accordance with one illustrative embodiment. As shown in FIGS. 4A-4E, these hierarchical feedback models may be for different types of offerings including services and products. FIGS. 4A-4E illustrate examples of the types of hierarchical feedback models that may be registered with the backend engine 310 of the HFA system.

Figure 4A:
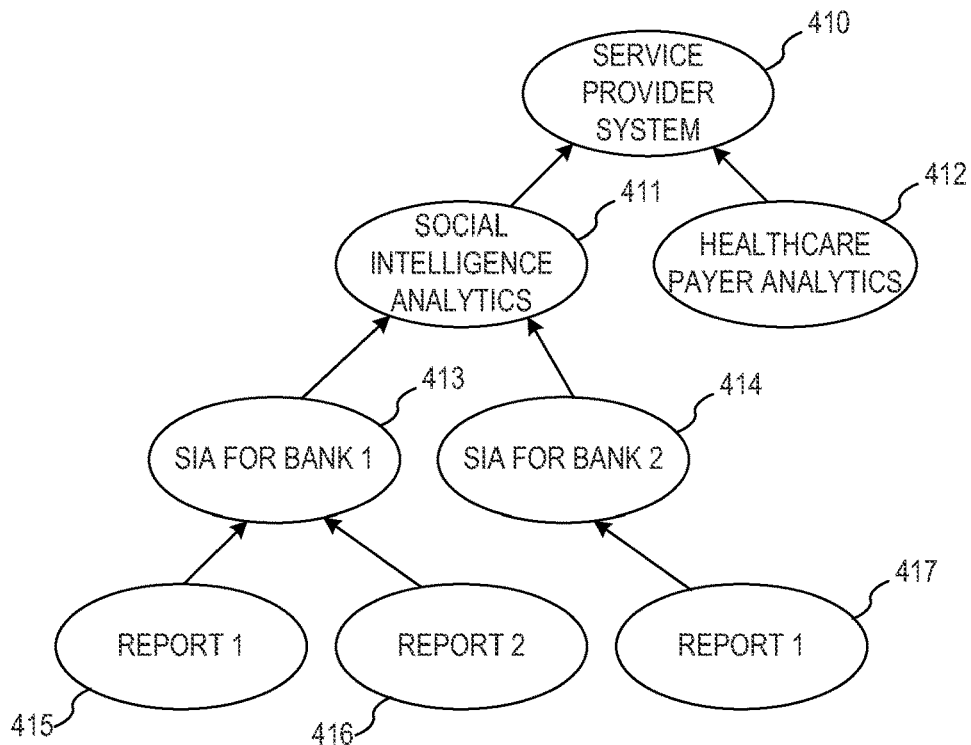
FIGS. 4A-4E are example diagrams of hierarchical structures for offerings which may be used to provide on-demand hierarchical aggregate feedback in accordance with one illustrative embodiment.

FIG. 4A is an example diagram of a hierarchical feedback model for a cloud service 410. As shown in FIG. 4A, the cloud service comprises a social intelligence analytics service 411 and a healthcare payer analytics service 412. The social intelligence analytics service 411 instantiates or has versions for a social intelligence analytics (SIA) service for bank 1 413 and an SIA for bank 2 414. Each instance presents resources to the users which the users may rate separately such that one instance of the SIA service may not receive the same user feedback or ratings as another. The SIA for bank 1 413 is a parent node of report nodes 415 and 416, while report node 417 is a child node of SIA for bank 2 414. As shown by the arrows in FIG. 4A, which represent edges between the nodes, aggregate feedback for child nodes provides a contribution, and thus influences, the aggregate feedback of the child nodes' parent nodes. Thus, aggregated user feedback for SIA for bank 1 413 influences the aggregate user feedback of social intelligence analytics service 411, along with aggregate user feedback for SIA for bank 2 414. Likewise, the aggregate user feedback for social intelligence analytics service 411 influences the aggregate user feedback for the cloud service 410, along with the healthcare payer analytics service 412.

Figure 4B:
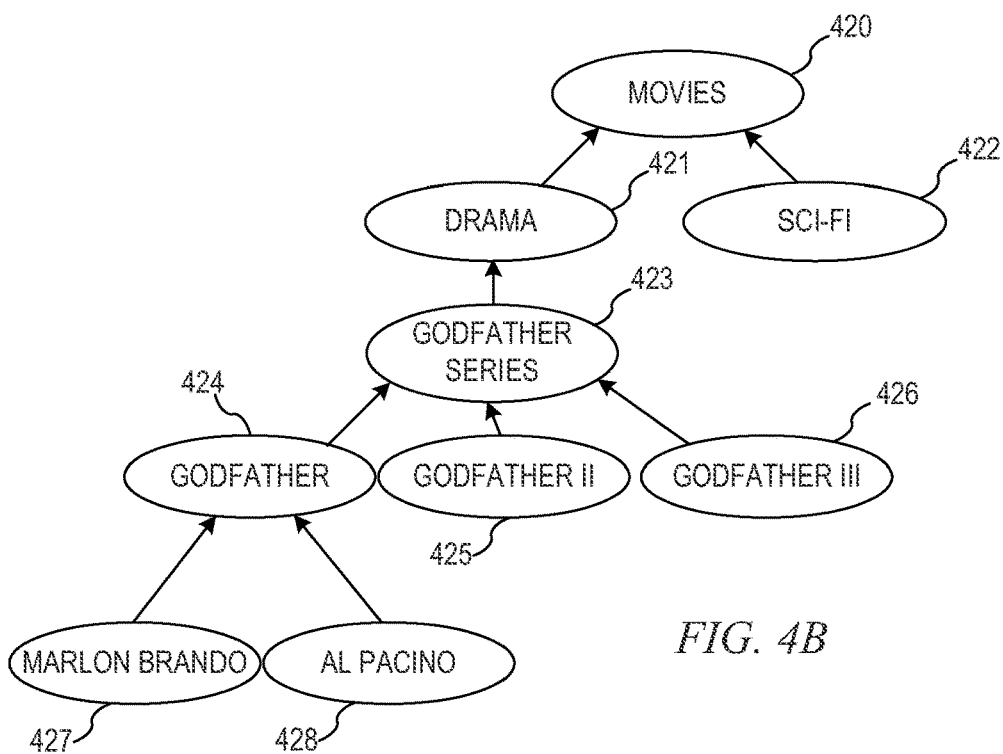

FIG. 4B illustrates a similar hierarchical feedback model that may be established and registered for a movies 420. At a first level, different movie genres are identified as nodes 421 and 422. At the next level, movie series are identified, including the movie series for the Godfather movies 423. At the next lower level, there are individual nodes representing the individual Godfather movies in the Godfather series, i.e. Godfather 424, Godfather II 425, and Godfather III 426. In a still lower level, individual cast members for each of the movies may be identified as separate nodes, such as Marlon Brando 427 and Al Pacino 428.

It should be appreciated that a user may provide user feedback for any of the nodes in the hierarchical feedback model. However, in known feedback mechanisms, there is no consideration of the dependency relationships among the nodes in the hierarchy, i.e. a flat user feedback algorithm is utilized. As discussed above, the illustrative embodiments propagate this user feedback up the hierarchy in accordance with the weights of edges between nodes linking to the node for which user feedback was provided. In FIGS. 4A-4E, the weights of the edges have not been shown for simplicity but the use of such weights with regard to propagating aggregated user feedback will be described in greater detail hereafter with regard to FIGS. 6A-6C.

Figure 4C:
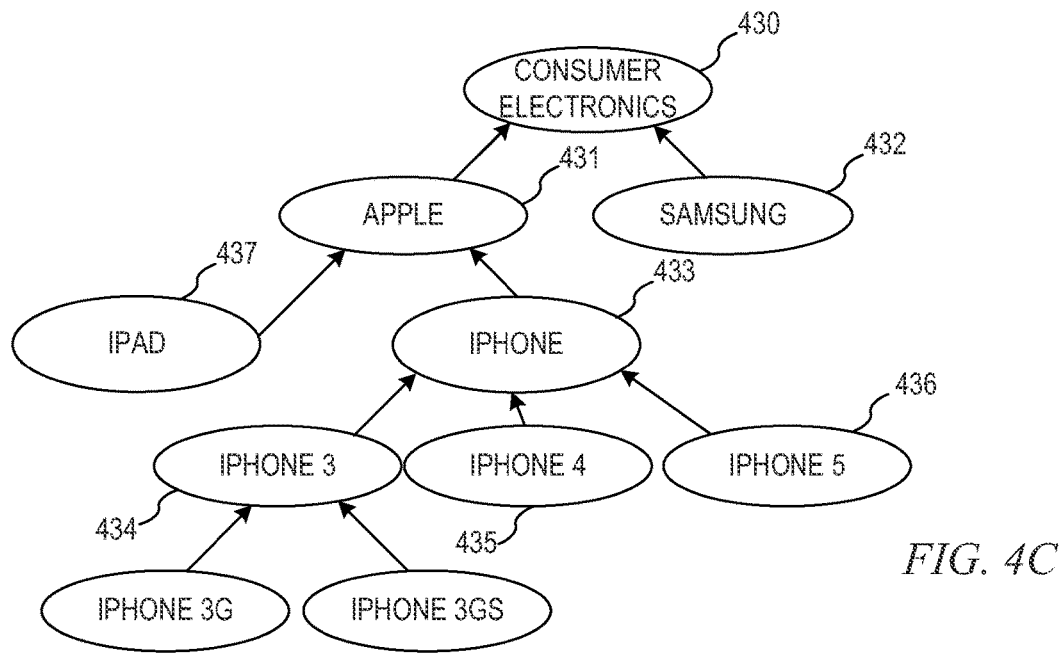

FIG. 4C illustrates yet another hierarchical feedback model for a consumer electronics product. This example illustrates a hierarchical configuration in which various releases of the electronics product are represented as nodes 434-436 in a lowest level of the hierarchy with the type of electronics product being represented as nodes 433, 437 at a next higher level. At a next higher level, the companies that release the products are represented as nodes 431, 432 followed by the general category of consumer electronics products.

Figure 4D:
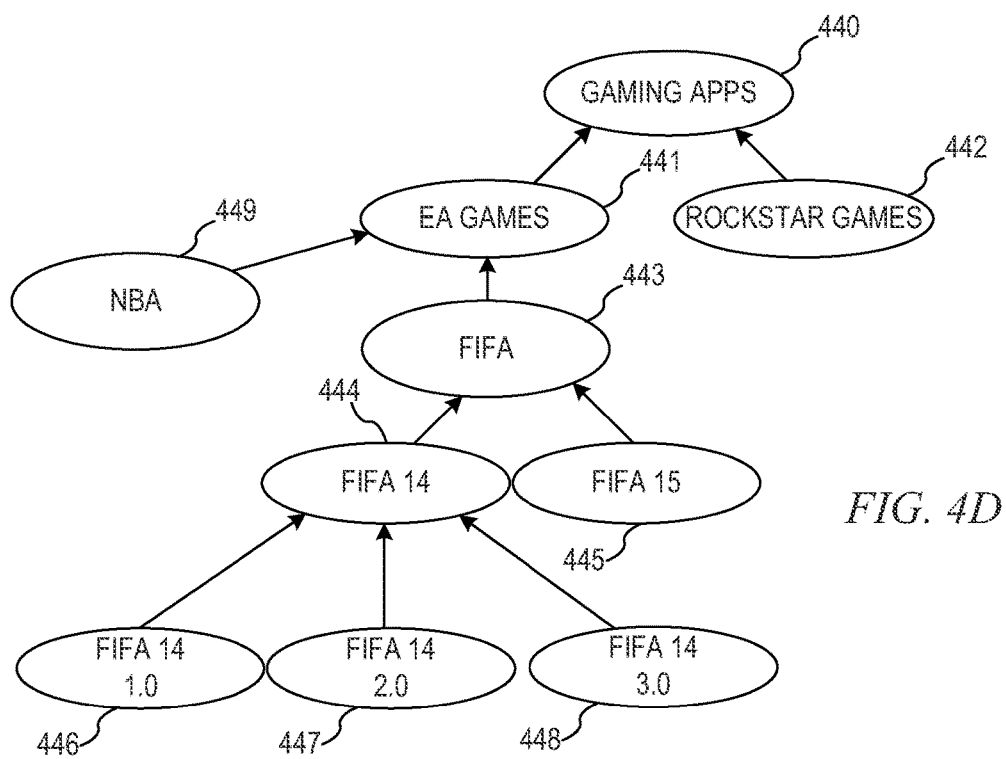
Figure 4E:
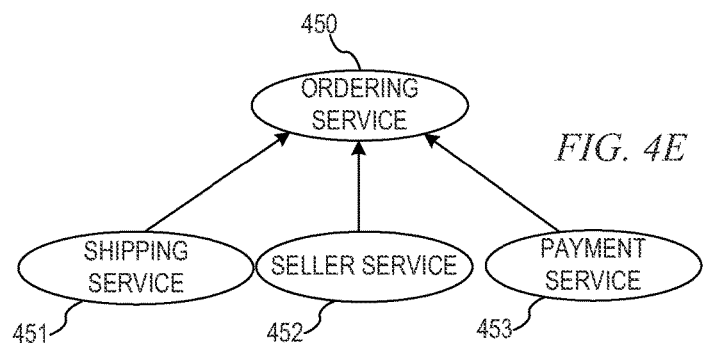

FIG. 4D illustrates another hierarchical feedback model for gaming applications 440 in which distribution companies are represented as nodes 441, 442, game titles are represented as nodes 443, 449, releases of the game title for various years are represented as nodes 444, 445, and versions of a release of the game title are represented as nodes 446-448. FIG. 4E illustrates another hierarchical feedback model for a composite service, in this case an ordering service 450, which is comprised of component or sub-services represented by nodes 451-453, i.e. an order acceptance service, a seller service, and a payment service.

FIGS. 4A-4E illustrate that hierarchical feedback models may be established for various offerings including consumer electronics products, software products, composite services, movies, and the like. These are just examples of the types of offerings that may be represented by hierarchical feedback models in accordance with the illustrative embodiments and other services and products may be likewise represented depending upon the particular implementation.

As noted above, the hierarchical feedback model provides the structure by which to determine how aggregate user feedback should be propagated from one node to the next to take into consideration the user feedback for components of composite offering (service, product, etc.) that provide underlying support for other nodes, i.e. nodes upon which other nodes are dependent. Thus, for example, a user's rating of a payment service 453 influences the rating of the composite ordering service 450 as a whole. Likewise, a user's rating of the game release FIFA 14 444, available for Electronic Arts Games, influences the user rating for the FIFA game title 443 as a whole, and further influences the user rating for the distribution company EA Games 441.

It should be appreciated that there may be times when a node does not have an associated aggregate user feedback score. For example, a node that does not depend on other nodes and which has not itself been rated by a user may not have an associated user rating. In such cases, the mechanisms of the illustrative embodiments may infer an aggregated user feedback score for the node based on similar nodes found in the same or different registered hierarchical feedback models. Similarity may be evaluated based on a variety of factors including similar names of the nodes, the level relationship between the current node and the similar node, the hierarchical structure connecting the nodes if any, a similarity in hierarchical structures associated with the current node and the similar node, the nodes with which the similar node is related compared to the nodes with which the current nodes is related, and the like.

Figure 5:
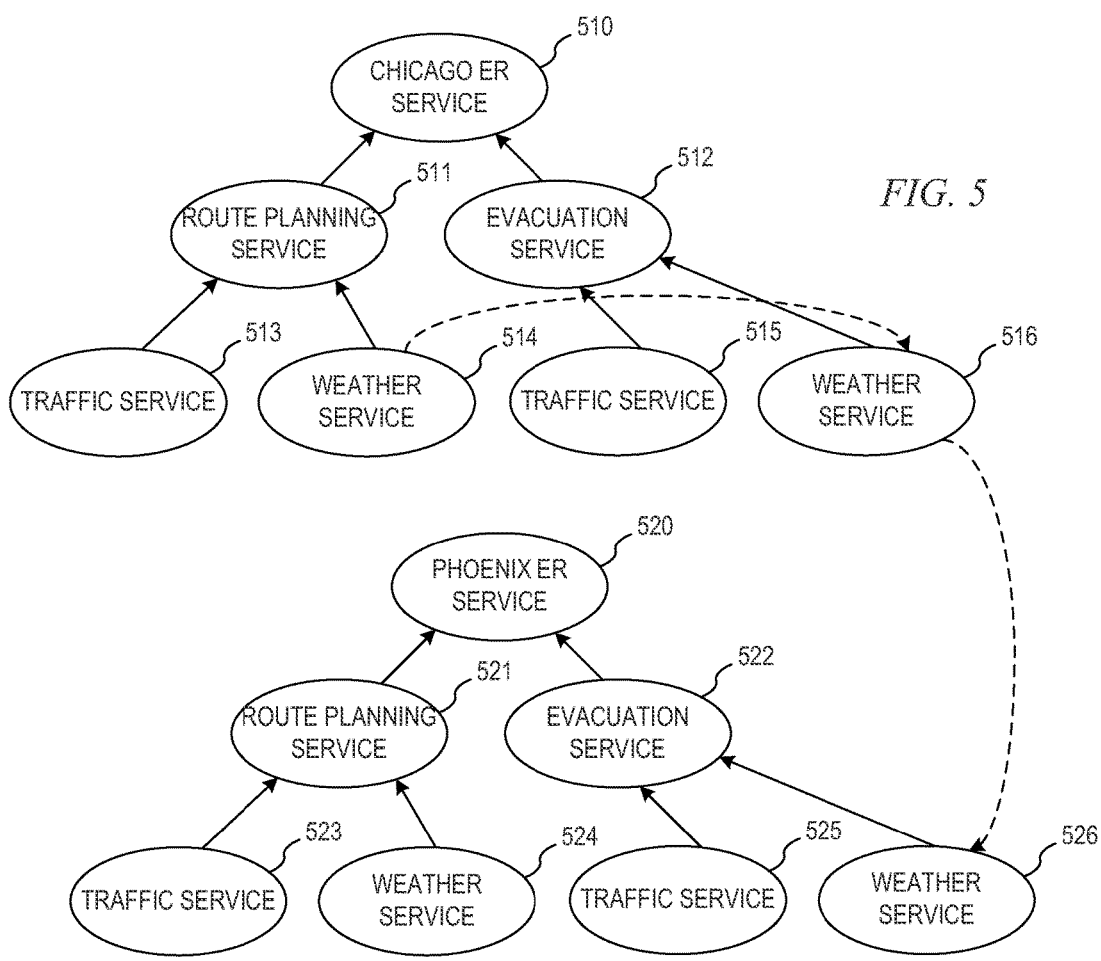
FIG. 5 illustrates example diagrams of hierarchical structures for different emergency response services to illustrate the use of similarity of nodes for inferring feedback information for nodes in accordance with one illustrative embodiment.

FIG. 5 illustrates example diagrams of hierarchical structures for different emergency response services to illustrate the use of similarity of nodes for inferring feedback information for nodes in accordance with one illustrative embodiment. In FIG. 5, a hierarchical feedback model is established from the Chicago Emergency Response (ER) service 510 which includes sub-services 511 and 512 which correspond to a route planning service and an evacuation service. The route planning service 511 has sub-services including traffic service 513 and weather service 514. The evacuation service 412 has sub-services including traffic service 515 and weather service 516. A similar hierarchical feedback model is provided for the Phoenix ER service 520, comprising similar nodes 521-526.

Assume that there is no aggregate user feedback available for node 516 in FIG. 5, but that there is aggregate user feedback available for nodes 514 and 526, as well as the other nodes of the two hierarchical feedback models. In order to generate a more accurate representation of the aggregate user feedback for the evacuation service 512, it is necessary to take into consideration the contribution from the user feedback for the weather service 516. However, since there is no user feedback associated with the weather service 516, its contribution is not accurately reflected.

In order to generate an initial aggregate user feedback score for the weather service 516, the mechanisms of the illustrative embodiments search for similar nodes in the same or different hierarchical feedback models. The similarity of the nodes are evaluated based on various factors with the most similar node being selected and its aggregate user feedback score being then attributed or associated with the weather service node 516. Some factors provide higher levels of similarity than others with multiple factors being combined to evaluate a total similarity of the nodes. For example, similarity of node labels may be a dominant factor in determining similarity such that nodes with similar labels, e.g., "weather service" in node 514 and 526 being similar to "weather service" in node 516, are determined to be strongly similar. Moreover hierarchical structure associated with the nodes may be evaluated to determine similarity such that nodes in a same level of their respective hierarchical feedback models are determined to be more strongly similar. Furthermore, sibling and cousin type relationships may be evaluated, where a "sibling" is a node that is within the same primary branch from a root node as the other node and "cousins" are nodes that are in different branches of root node. For example, in FIG. 5, node 514 is a cousin to node 516.

In addition if the nodes are in different hierarchical feedback models, but the majority of the structure associated with the nodes in the different hierarchical feedback models is similar, i.e. same nodes with same node labels are connected in a similar hierarchical arrangement, then the nodes may be considered to be strongly similar. For example, in FIG. 5, due to the strong similarity between the structure in the two hierarchical feedback models associated with nodes 516 and 526, and the similarity of the labels of the nodes 516 and 526, it may be determined that nodes 516 and 526 are more strongly similar than nodes 516 and 514. This is because, while node 514 has a similar label, node 514 is a cousin to node 516 and thus, is associated with a different hierarchical structure (nodes 511 and 513) than node 516 (nodes 512 and 515 which are similar to nodes 522 and 525). Thus, node 526 may be selected as a similar node to node 516 and the aggregate user feedback associated with node 526 may also be attributed to node 516 such that node 516's aggregate user feedback score is set equal to that of node 526.

Of course other similarity evaluations may be utilized without departing from the spirit and scope of the illustrative embodiments. Any similarity factors may be considered depending upon the implementation as long as it is determined that those factors indicate nodes that are similar for purposes of inferring aggregate user feedback scores between the similar nodes.

While FIG. 5 illustrates the two emergency response services as separate hierarchical feedback models, it should be appreciated that the principles discussed above and the mechanisms of the illustrative embodiments are also applicable when these services are part of the same overall hierarchical feedback model. For example, a root node, or parent node of the two models shown in FIG. 5 may be provided, such as "Weather Service" with both the Chicago ER service node 510 and its sub-tree, and Phoenix ER service node 520 and its sub-tree, being child nodes of the "Weather Service" root or parent node in the larger hierarchical feedback model. In such a situation, the Chicago ER service 510 and Phoenix ER service 520 may be considered sibling or cousin nodes in the larger hierarchical model depending upon the particular context.

As discussed above, one of the principle operations of the illustrative embodiments is to aggregate user feedback information for a node taking into consideration contributions from other related nodes, such as child nodes, in a hierarchical feedback model. "Related" in this context refers to nodes that are connected to the current node either directly or indirectly along a branch from the root node of the hierarchical feedback model. Thus, nodes in other branches that are not connected by way of an intermediate node located within the hierarchical feedback model at a lower level than the root node are not considered "related". The degree of "relatedness" may be based on a relative distance between the nodes, e.g., number of edges and nodes between the nodes.

Figure 6A:
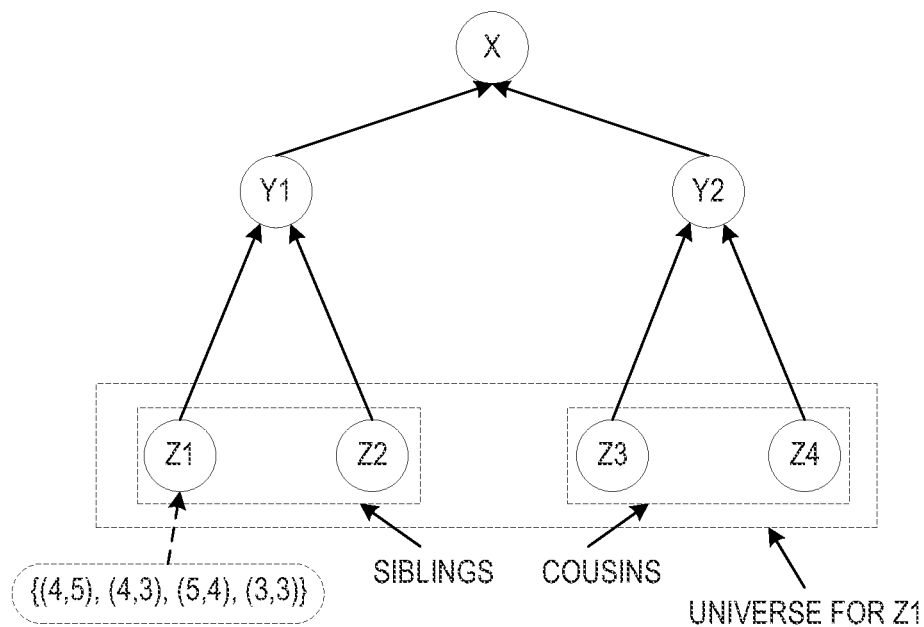
FIGS. 6A-6C are example diagrams of a generalized hierarchical structure for illustrating aggregate feedback generation and propagation in accordance with one illustrative embodiment.
Figure 6B:
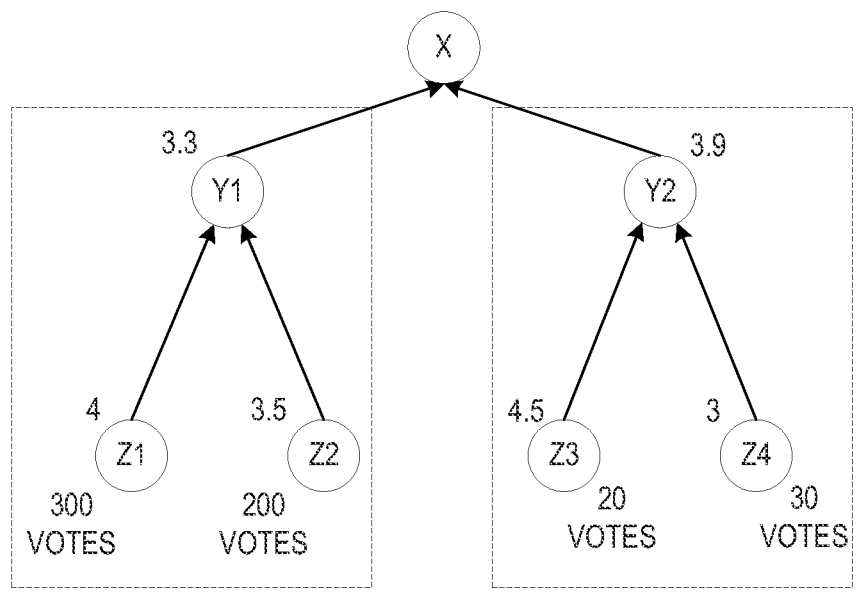
Figure 6C:
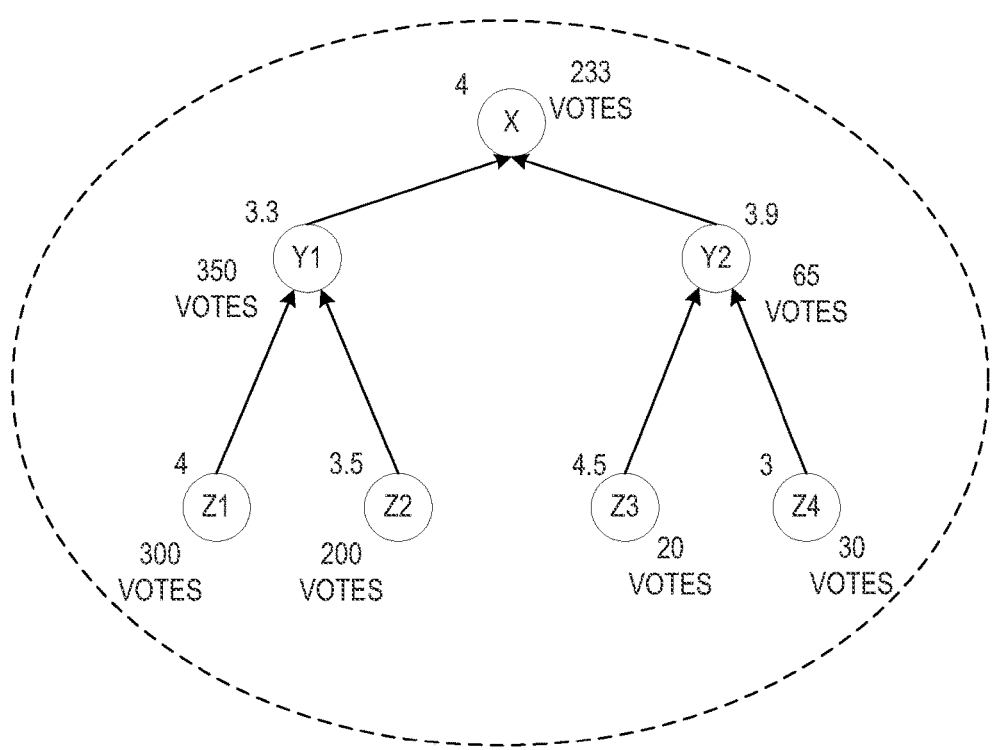

In addition to generating aggregate user feedback information for a node, the principle operations of the illustrative embodiments further provide mechanisms for propagating the aggregate user feedback from node to node within a hierarchical feedback model based on the weights of edges between nodes which indicate a degree of influence or dependency that one node has on another. The propagation is performed from lower levels to higher levels (child to parent, or leaf nodes to root node) within the hierarchical feedback model. It should be appreciated that there may be many different formulations for how exactly to propagate the aggregate user feedback of a node in the hierarchical feedback model to other nodes in the hierarchical feedback model, any of which are intended to be within the spirit and scope of the illustrative embodiments. FIGS. 6A-6C are provided hereafter to illustrate one possible implementation for performing such aggregate user feedback generation and propagation in accordance with one illustrative embodiment.

As stated, FIGS. 6A-6C are example diagrams of a generalized hierarchical feedback model for illustrating aggregate feedback generation and propagation in accordance with one illustrative embodiment. In the example hierarchical feedback model of FIGS. 6A-6C, an offering X (e.g., a service, product, or the like) has component offerings Y1 and Y2. Each of the component offerings Y1 and Y2 have their corresponding sub-component offerings Z1, Z2, Z3, and Z4. Thus, a hierarchy for propagating feedback is established in which the offering X is at the highest level (or root level), Y1 and Y2 are at an intermediate level, and Z1-Z4 are at a lowest level of the hierarchy. It should be appreciated that this example hierarchy is kept simple by having a single intermediate level for illustration purposes and actual hierarchies may comprise many intermediate levels with the resulting hierarchical feedback model being very complex. In addition, for simplicity of the following description, the weights of each of the edges is assumed to be 1, however in actual implementation one or more of the edges may have differing weights less than or greater than 1, depending upon the implementation, which may be applied to the child contributions of aggregate user feedback as weighting factors when performing propagation of user feedback from node to node.

Before beginning a more detailed discussion of the user feedback aggregation and propagation calculations performed in this illustrative embodiment, it is useful to first have an understanding of the various values that will be used in the calculations. The following is a listing of the values and their descriptions as referenced in the equations and calculations described hereafter:
S(x) is the user feedback score for node x;
B(x) is the Bayesian estimation of node x;
C(x) is the aggregate user feedback score contribution of node x's child nodes;
R(x) is the average rating of node x;
U(x) is the average rating of the universe of node x, where the "universe" comprises the nodes at a same level of the hierarchical feedback model as the node x;
$Ra_x$ is the rating value for node x;
$Re_x$ is the relevance value for node x;
V(x) is the cumulative number of votes for node x;
$V_x$ is the total number of votes for node x, where "votes" represent the weighted sum of the number of users that provide feedback for node x;
$C_x$ is a child node of node x; and
d(x, y) is the number of edges between node x and node y.

With regard to FIG. 6A, assume that the sub-component offering Z1 receives a set of user feedback information from 4 users, via the frontend engine of the illustrative embodiments, that comprises the tuples (rating, relevance) of [(4,5), (4,3), (5,4), (3,3)] as shown. Thus, each user feedback has a value for the user's subjective perception of quality (rating) and usefulness to the user's needs (relevance) on a defined scale which, in this example, is a 5-star scale such that each value may have an integer setting from 0 to 5. The aggregate user feedback score for sub-component offering Z1 may be calculated using an equation such as that shown as equation 1 below which combines Z1's contribution B(Z1) as a Bayesian estimation, with Z1's child node contributions C(Z1):

$$S(z_1) = a \times B(z_1) + (1 - \alpha) \times C(z_1), \quad \text{(Eq. 1)}$$

$$\begin{cases} a = \dfrac{3}{4} & \text{if } z_{1children} \neq \phi \\ a = 1 & \text{if } z_{1children} = \phi \end{cases}$$

The value for α is a parameter that assigns weight to the contributions depending on the particular implementation. In the above example, this value is set to 1 if Z1 has no children and thus, the aggregate user feedback score for Z1 is entirely based on its own direct user feedback. If Z1 has children, then α is set to ¾ so that the aggregate feedback for node Z1 is primarily based on the user feedback directly for the offering corresponding to node Z1 but is also based partly (¼) on the user feedback associated with the child nodes of node Z1. It should be noted that the particular values for α discussed above are just examples and are not intended to state or imply any limitation with regard to the possible weighting factors that may be utilized, i.e. other values may be used without departing from the spirit and scope of the illustrative embodiments. For example, in other illustrative embodiments, the value for α may be set to any value in the range of 0.5 to 1.0 when Z1 has child nodes, depending upon the particular implementation. In some cases, the value of α may be set based on the number of child nodes that Z1 has such that the value for α is reduced as the number of child nodes increases. Other ways of determining what value to give to a may be used without departing from the spirit and scope of the illustrative embodiments.

The value for node Z1's direct aggregate user feedback (user feedback specifically directed to node Z1 as opposed to node Z1's child offerings), i.e. B(Z1), in one illustrative embodiment, is aggregated using a Bayesian estimation model for aggregation as shown in Equation 2 below:

$$B(z_1) = \beta \times R(z_1) + (1 - \beta) \times U(z_1), \quad \text{(Eq. 2)}$$

-continued $$\begin{cases} \beta \longrightarrow 0 & \text{if } v \longrightarrow 0 \\ \beta \longrightarrow 1 & \text{if } v \longrightarrow \infty \end{cases}$$

The Bayesian estimation was selected for the illustrative embodiment because if there is not enough direct user feedback for the node Z1, then the feedback of nodes which are similar to Z1 may be used to get a more accurate user feedback score. Due to similarity, there is an expectation that Z1's feedback and score will be similar to these nodes. That is, node Z1's user feedback score is aggregated based on its average user feedback and the average user feedback of Z1's universe U(Z1). The value β is a parameter that assigns weight to the averages depending on the particular implementation desired. For example, β tends to 0 if there are not enough votes v (number of users providing feedback) and thus, most of the weight is given to the universe average U(Z1). On the other hand, the value β tends to 1 if there are enough votes, and most of the weight is then given to Z1's own average feedback. It should be appreciated that the value for β may thus, be dynamically determined to be a particular value in the range from 0 to 1 based on the number of votes a particular node has at the time of the calculation.

The average rating user feedback for node Z1, i.e. R(Z1), in one illustrative embodiment, is calculated using a relationship such as shown in Equation 3. Equation 3 provides a weighted average of Z1's ratings ($Ra_i$), where the weight of each rating comes from the respective relevance ($Re_i$):

$$R(z_1) = \frac{\sum_{i=1}^{k} Ra_i \times Re_i}{\sum_{i=1}^{k} Re_i} \quad \text{(Eq. 3)}$$

Thus, taking the example user feedback tuples for node Z1 mentioned above, each rating feedback is multiplied by its corresponding relevance feedback and the result is summed with the products of the other user feedback tuples. The sum is then divided by the sum of the relevance across all of the tuples:

R(Z1)=((4*5)+(4*3)+(5*4)+(3*3))/(5+3+4+3)=4.1

Thus, the aggregate of the direct user feedback for node Z1 is equal to 4.1 in this example.

In order to calculate node Z1's universe average feedback U(Z1), the universe of node Z1 is first defined as the set of nodes which have certain similarity with node Z1. For instances, in FIG. 6A, nodes Z1 and Z2 are sibling nodes and thus, have some similarity, e.g., multiple versions of the same song (regular, remix, and unplugged). Further, it is possible for node Z1 to have similarity with cousin nodes Z3 and Z4, e.g., sports gaming applications by the same vendor (FIFA and NHL by Electronic Arts Sports, for example). The universe of a node is a parameter that may be defined in any way suitable to the particular implementation such that the universe comprises nodes that have a desired degree of similarity. In the depicted example, the universe of a node is defined as the sibling and cousin nodes of the node in question, where sibling nodes are nodes that have edges to a same parent node as the node in question and are at a same level of the hierarchical feedback model as the node in question, and cousin nodes are nodes at the same level of the hierarchical feedback model as the node in question, but have edges to nodes that do not have a direct edge to a common parent node as the node in question.

A similarity weight is assigned to the nodes in the universe based on the particular implementation and definition of the universe. For example, the similarity weight for node Z1's cousin nodes is set to a lower weight than sibling nodes because they are more distant from node Z1 in the hierarchical feedback model. Thus, for example, assuming that node Z1's universe contains all of its siblings and cousin nodes, with sibling nodes having equal similarity weight and cousin nodes having half similarity weight (this is just an example and the similarity weights can be adjusted for different implementations), and each sibling having k user feedback and each cousin having p user feedback, the universe average feedback for node Z1, i.e. U(Z1), may be calculated using Equation 4 as follows:

$$U(z_1) = \frac{\sum_{i=1}^{m} \left( \sum_{j=1}^{k} Ra_j \times Re_j \right)_i + \frac{1}{2} \sum_{i=1}^{n} \left( \sum_{j=1}^{p} Ra_j \times Re_j \right)_i}{\sum_{i=1}^{m} \left( \sum_{j=1}^{k} Re_j \right)_i + \frac{1}{2} \sum_{i=1}^{n} \left( \sum_{j=1}^{p} Re_j \right)_i} \quad \text{(Eq. 4)}$$

Thus, the R(Z1) and U(Z1) values may be utilized in Equation 2 above to obtain the Bayesian estimation of the aggregate user feedback score for node Z1. This value may then be utilized to perform the calculation according to Equation 1 above which, because node Z1 has no child nodes, results in the aggregate user feedback score S(Z1) being equal to B(Z1). Thus, utilizing the above equations, for purposes of continuing the present example, it is assumed that U(Z1)=4, β=0.4 and α=1, R(Z1)=4.1, B(Z1)=0.4*4.1+(1−0.4)*4=4, and S(Z1)=1*4+(1−1)*C(Z1)=4. A similar calculation can be made for the aggregate user feedback scores for nodes Z2, Z3, and Z4, i.e. S(Z2), S(Z3), and S(Z4). For purposes of the present example, it will be assumed that similar calculations are made for each of the nodes Z2, Z3, and Z4 which result in aggregate user feedback scores of S(Z2)=3.5, S(Z3)=4.5, and S(Z4)=3, as shown in FIG. 6B.

The aggregated user feedback scores of nodes are propagated up all the way to the root and diminish with each level of the hierarchical feedback model. For example, with regard to node Y1, the aggregated user feedback score calculated by applying Equation 1 combines node Y1's contribution and contributions from node Y1's child nodes Z1 and Z2. Node Y1's contribution, from its direct user feedback, can be calculated by applying Equation 2 above. The contribution from node Y1's child nodes C(Y1), in one illustrative embodiment, is calculated using Equation 5 hereafter which uses a weighted average to aggregate the aggregated user feedback scores of the child nodes. Each child node's score's weight is decided based on the amount of user feedback that the particular child node has received, i.e. the number of votes $v(c_i)$ associated with that child node:

$$C(y_1) = \frac{\sum_{i=1}^{k} S(c_i) \times V(c_i)}{\sum_{i=1}^{k} V(c_i)} \quad \text{(Eq. 5)}$$

The number of cumulative votes V(Y1) for node Y1 are calculated using Equation 6 hereafter which is based on node Y1's own votes and the cumulative votes of node Y1's child nodes:

$$V(y_1) = V_{y1} + \sum_{i=1}^{k} \frac{V(c_i)}{2^{d(c_i, y_1)}}, \{d(c_i, y_1) = |e|_{c_i}^{y_1}\} \quad \text{(Eq. 6)}$$

The relative contribution of a child node's cumulative votes diminishes as the votes are propagated to higher levels, based on their distance from the node being evaluated. The distance $d(C_i, Y_j)$ is calculated as the number of edges between the nodes $C_i$ and $Y_j$. For instances, only ¼ of node Z2's cumulative votes contribute to node X's cumulative votes. Node Y1's own votes are calculated using Equation 7 as the sum of all the relevance user feedback input ($Re_i$) node Y1 receives:

$$V_{y_1} = \sum_{i=1}^{k} Re_i \quad \text{(Eq. 7)}$$

Thus, with reference again to FIG. 6B, it is assumed that node Z1 has 300 votes, and node Z2 has 200 votes, i.e. V(Z1)=300 and V(Z2)=200. If B(Y1)=3, S(Z1)=4, and S(Z2)=3.5, then C(Y1) using Equation 5 above is calculated as C(Y1)=((4*300)+(3.5*200))/(300+200)=3.8. Now, if α=0.6, the aggregate user feedback score for node Y1 is calculated as S(Y1)=0.6*3+(1−0.6)*3.8=3.3. A similar calculation can be performed with regard to node Y2 with nodes Z3 and Z4 having 20 and 30 votes, respectively, and scores of 4.5 and 3, respectively, to thereby generate an aggregate user feedback score for node Y2 as S(Y2)=3.9, as shown in FIG. 6B.

With reference now to FIG. 6C, assume that node Y1 has 100 votes associated directly with node Y1, i.e. $V_{y1}$=100 (see Equation 7 above). Using Equation 6 above to calculate the cumulative votes for node Y1, one obtains V(Y1)=100+(300/2¹)+(200/2¹)=350. Thus, the cumulative votes for node Y1 is 350. A similar calculation may be made for node Y2, assuming that $V_{y2}$=40, such that the cumulative votes for node Y2 is 65 votes, i.e. V(Y2)=40+(20/2¹)+(30/2¹)=65.

Continuing the propagation up to node X, using Equations 1-7 above, one obtains the following values:

C(X)=((3.3*350)+(3.9*65))/(350+65)=3.4

Let B(X)=4.5 and $V_X$=25

V(X)=25+350/2+65/2=233 votes

Let α=0.5

S(X)=0.5*4.5+(1−0.5)*3.4=4

Thus, through the mechanisms of the illustrative embodiments, algorithms are provided for calculating the aggregate user feedback for a component of a composite offering, such as a service or product, based on the direct user feedback for that component and contributions from sub-components related to that component. Moreover, similar components may also be taken into consideration in cases where the amount of user feedback for a component is not sufficiently high enough, e.g., sibling and cousin components. All of these factors combine to generate an aggregate user feedback score for the particular component. This aggregate user feedback score for the particular component may further be propagated up a hierarchical feedback model so as to propagate the influence of the components' aggregate user feedback to other components that depend on it. This provides a much more accurate model of the actual user feedback for components taking into consideration the user feedback of the components upon which they depend in a hierarchical manner.

Figure 7:
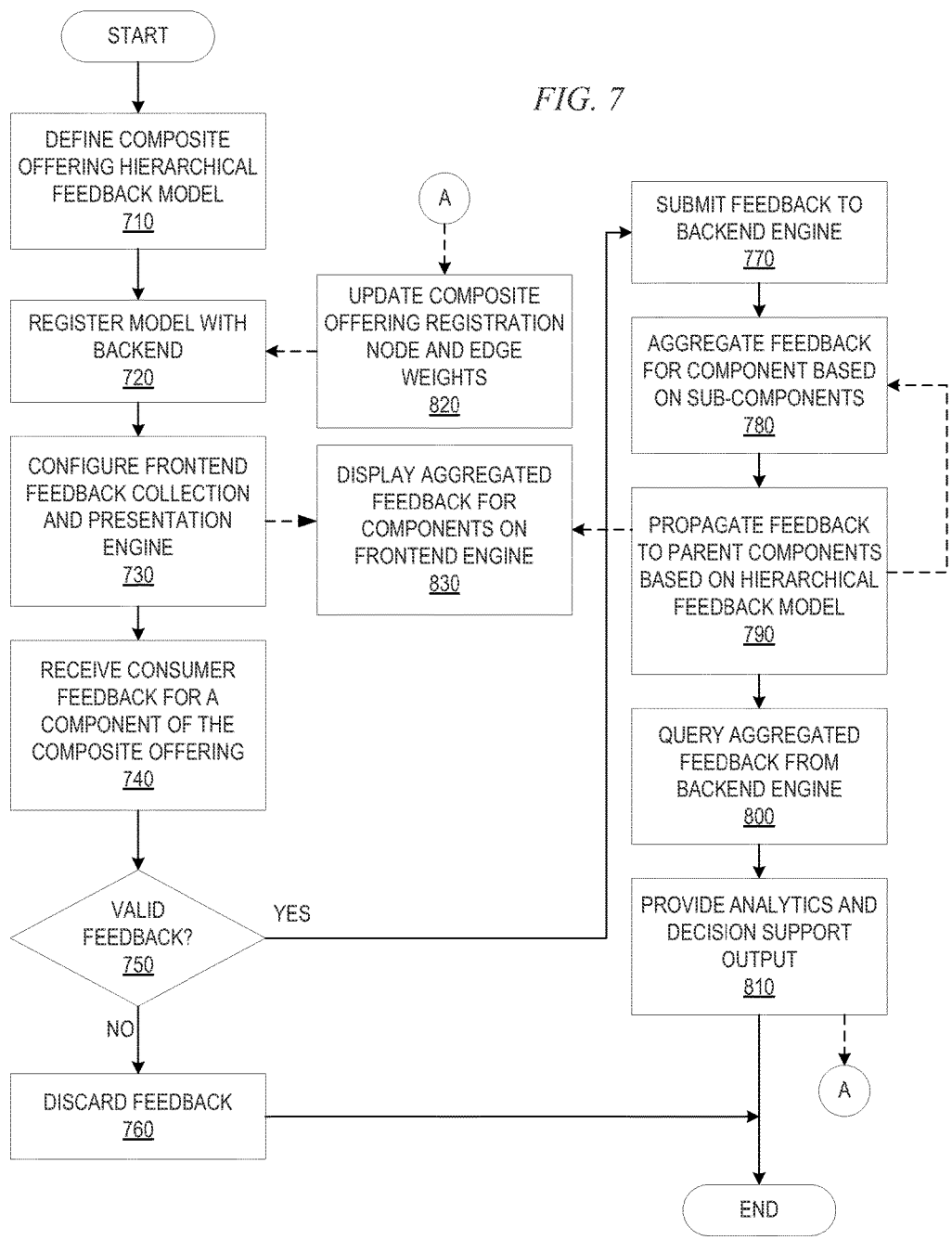
FIG. 7 is a flowchart outlining an example operation for providing on-demand hierarchical aggregate feedback in accordance with one illustrative embodiment.

FIG. 7 is a flowchart outlining an example operation for providing on-demand hierarchical feedback aggregation in accordance with one illustrative embodiment. The operation outlined in FIG. 7 may be performed using a hierarchical feedback aggregation system such as that shown in FIG. 3 above with operations being distributed between the front end engine and the backend engine in the manner previously described. As such, the operation outlined in FIG. 7 may be implemented using software executed on hardware of one or more data processing systems or computing devices, dedicated hardware of one or more data processing systems or computing devices, or any combination of software and hardware elements of data processing systems or computing devices.

It should be appreciated that FIG. 7 represents a single iteration of the operation in accordance with one illustrative embodiment. The operation outlined in FIG. 7 may be repeated many times based on the needs of the provider and the operation of the composite offering. For example, steps 740-830 may be repeated many times based on a periodic execution of these operations, in response to each new user feedback received, or the like.

As shown in FIG. 7, the operation starts with a composite offering hierarchical feedback model being defined (step 710). As noted above, this definition may be performed using a graphical user interface tool offered via an on-demand registration/request engine 312 of a backend engine 310 of the HFA system, for example, through which a user may construct the hierarchical model as a set of nodes and edges connecting nodes, with initial weights assigned to the nodes based on an initial estimation of the level of dependence that one node has on another with regard to user feedback.

The model is registered with the backend engine for use in collecting, calculating, aggregating, and propagating user feedback (step 720). The frontend engine is then configured to collect user feedback and present user feedback to users for the particular composite offering (step 730). This operation may involve customizing general templates utilized by the frontend engine to present questions to users, deploying the frontend engine into a software environment of the composite offering or system that provides the composite offering, as well as any other configuration operations that enable the frontend engine to operate within the providers computing system(s) to collect user feedback information, and optionally user profile information, and provide this information to the backend engine.

User (or consumer) feedback for a component in the composite offering is received (step 740) and is checked for validity (step 750), e.g., by checking the user's demographics against the desired demographics specified by the offering provider, by comparing the user's credibility with a threshold level of credibility by evaluating the user's history of user feedback, or any other criteria that may used to accept or reject the user's feedback as being feedback upon which the mechanisms of the illustrative embodiments may be implemented. If the user's feedback is not valid, the feedback is discarded (step 760) and the operation ends or, alternatively, may return to step 740 and continue monitoring for further user feedback from other users.

If the user feedback is valid, then the feedback is submitted to the backend engine (step 770) which then aggregates the user feedback for the component based on contributions from user feedback for that component and its sub-components (step 780). The resulting aggregate user feedback for the component is then propagated to the parent components based on the hierarchical feedback model (step 790). As noted by the dashed lines in FIG. 7, this may cause a recursive operation where the parent nodes' aggregate user feedback is then updated and propagated by way of repeated executions of steps 780-790. Moreover, the updated user feedback for the component, and potentially the parent components, may be used to update a display of the aggregated user feedback for components on the frontend engine (step 830).

At step 800, a query may be received to access the aggregated user feedback from the backend engine. This query may be a query from a user via the frontend engine, a query from a provider of the composite offering via an administrator console, a query from an administrator of the HFA system, or the like. The query may request certain analytical operations to be performed, such as providing an average of the user feedback across all components of the composite offering, a particular graphical display of the user feedback, a filtered display of the user feedback, e.g., only user feedback that is less than a specified threshold, or the like. The requested analytics are performed and an output to support decision making is generated and output (step 810). In addition, the composite offering registration node and edge weights may be updated based on the results of the analytics (step 820). The operation then terminates.

Thus, the illustrative embodiments provide mechanisms for providing on-demand user feedback aggregation and propagation in a composite offering. The mechanisms of the illustrative embodiments utilize multiple different factors to represent the user feedback, such as quality rating and relevance rating. The mechanisms of the illustrative embodiments further utilize a hierarchical feedback model of the composite offering to facilitate propagation of user feedback to components of the composite offering based on specified dependencies and relationships between the components. Thus, a more accurate representation of the actual user experience with the various components of the composite offering is achieved.

It should be appreciated that while examples of offerings have been provided in the description and drawings, the illustrative embodiments are not limited to these specific examples and any offering may be the subject of the mechanisms of the illustrative embodiments. For example, various hierarchical feedback models may be generated and used with the mechanisms of the illustrative embodiments for various types of offerings including, but not limited to, services, applications, artistic works (e.g., movies, books, musical compositions, etc.), electronic products, business establishments (e.g., restaurants, retail stores, corporations), information technology solution packages, or any other type of offering.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a hierarchical feedback aggregation (HFA) system implemented in a plurality of data processing systems, each data processing system comprising a processor and a memory, for collecting and presenting user feedback information for a computer provided composite offering, the method comprising:

registering, by a backend engine of the HFA system executing in a first data processing system, a hierarchical feedback model for the computer provided composite offering, wherein the computer provided composite offering is one of a composite service or composite product comprising a plurality of computer implemented components operating in one or more computing devices, wherein the plurality of computer implemented components comprise at least one of computer implemented sub-services or computer implemented sub-products, and wherein the hierarchical feedback model comprises nodes representing the computer implemented components of the computer provided composite offering and edges representing relationships between the computer implemented components;

receiving, via a frontend engine of the HFA system executing in a second data processing system providing at least one computer implemented component of the computer provided composite offering, user feedback for an identified computer implemented component of the computer provided composite offering;

generating, by the backend engine of the HFA system, an aggregate user feedback score for the identified computer implemented component based on a combination of the user feedback for the identified computer implemented component and aggregate user feedback scores for child components of the identified computer implemented component in the hierarchical feedback model;

dynamically updating, by the backend engine of the HFA system, the hierarchical feedback model, to generate a modified hierarchical feedback model, based on the aggregate user feedback score for the identified computer implemented component, wherein dynamically updating the hierarchical feedback model comprises updating weights associated with edges in the hierarchical feedback model based on a function of a usage metric associated with the identified computer implemented component, and a distance of the edge from a first node, in the hierarchical feedback model, corresponding to the identified computer implemented component; and outputting, by the backend engine, a representation of the generated aggregate user feedback score for the identified computer implemented component for decision support utilization, wherein the representation further comprises a representation of the modified hierarchical feedback model.

2. The method of claim 1, further comprising:

propagating, by the backend engine of the HFA system, the aggregate user feedback score for the identified computer implemented component up the hierarchical feedback model to one or more parent nodes of the hierarchical feedback model from which the first node corresponding to the identified computer implemented component is dependent.

3. The method of claim 2, wherein propagating the aggregate user feedback score for the identified computer implemented component up the hierarchical feedback model comprises, for a parent node in the one or more parent nodes, calculating an aggregate user feedback score for the parent node based on a combination of the aggregate user feedback score for the identified computer implemented component and a user feedback score associated with the parent node.

4. The method of claim 1, wherein the user feedback for the identified computer implemented component comprises a first user feedback part corresponding to a quality rating and a second user feedback part corresponding to a relevance rating, and wherein generating the aggregate user feedback score for the identified computer implemented component comprises generating the aggregate user feedback score as a function of the quality rating weighted by the relevance rating.

5. The method of claim 4, wherein generating the aggregate user feedback score further comprises weighting the user feedback for the identified computer implemented component based on an evaluation of credibility of a user that provided the user feedback.

6. The method of claim 1, wherein the hierarchical feedback model is a first hierarchical feedback model, and wherein at least one child component of the identified computer implemented component does not have an aggregate user feedback score provided based on direct user feedback provided for the at least one child component, and wherein for the at least one child component, an aggregate user feedback score is inferred by identifying at least one similar component in a second hierarchical feedback model, associated with another computer provided composite offering, that is similar to the first hierarchical feedback model, and associating an aggregate user feedback score of the at least one similar component with the at least one child component.

7. The method of claim 6, wherein identifying at least one similar component comprises identifying at least one of a similar hierarchical structure within the similar hierarchical feedback model, or a similar name associated with a second node within the similar hierarchical feedback model.

8. The method of claim 1, wherein the user feedback for the identified computer implemented component is received by the frontend engine of the HFA system from a component specific console implemented in the second data processing system, and wherein the component specific console interfaces with a user to collect the user feedback from the user via presentation of one or more questions requesting the user feedback, and provides the collected user feedback to the frontend engine.

9. The method of claim 1, wherein the user feedback for the identified computer implemented component is received directly by the frontend engine by using one or more templates to present questions to a user to collect the user feedback, and wherein the one or more templates are customized for the identified component.

10. The method of claim 5, further comprising receiving, from a provider of the computer provided composite offering, one or more identifiers of one or more characteristics of a target user of the computer provided composite offering, wherein weighting the user feedback for the identified component based on the evaluation of credibility of the user that provided the user feedback further comprises weighting the user feedback based on a correspondence of one or more characteristics of the user that provided the user feedback with the one or more characteristics of the target user.

11. The method of claim 1, wherein the aggregate user feedback score is generated based on a function of direct user feedback and user feedback for similar components of the computer provided composite offering, wherein similar components are computer implemented components associated with similar nodes that are either cousin nodes at a same level of the hierarchical feedback model as an identified node corresponding to the identified computer implemented component, but do not have direct edges to a same parent node as the identified node, or sibling nodes that are nodes in the hierarchical feedback model that have edges connecting them to the same parent node as the identified node.

12. The method of claim 11, wherein similar nodes are weighted by a similarity weight in the function, and wherein the similarity weight is based on a type of similarity.

13. The method of claim 12, wherein sibling nodes have a first similarity weight different from cousin nodes which have a second similarity weight.

14. The method of claim 13, wherein the first similarity weight is higher than the second similarity weight.

15. The method of claim 2, wherein the aggregate user feedback score is propagated up to a root node of the hierarchical feedback model and a contribution of the aggregate user feedback to user feedback for higher level nodes is diminished with each higher level of the hierarchical feedback model.

16. The method of claim 1, wherein receiving user feedback for the identified computer implemented component of the computer provided composite offering comprises receiving different user feedback of different feedback types, and wherein generating the aggregate user feedback score comprises utilizing a correlation function that correlates feedback types having different scales of feedback to a common aggregate user feedback score scale.

17. The method of claim 15, wherein, for each higher level node, the contribution of the aggregate user feedback to the user feedback for the higher level node is diminished by an amount dependent upon a distance of the higher level node from a third node corresponding to the aggregate user feedback in the hierarchical feedback model.

18. The method of claim 1, wherein the plurality of computer implemented components comprise a plurality of computer implemented software services executing on different computing devices, and wherein at least one of the computer implemented software services provides input data to one or more other computer implemented software services in the plurality of computer implemented software services.

19. The method of claim 1, wherein the plurality of computer implemented components comprise at least two different computer implemented components provided by at least two different computing devices of the one or more computing devices.

20. The method of claim 17, wherein receiving user feedback for the identified computer implemented component of the computer provided composite offering comprises automatically modifying one or more general templates, for presenting questions to a user to solicit feedback, to be customized for the identified computer implemented component.

* * * * *